(12) United States Patent
Welch et al.

(10) Patent No.: US 7,383,853 B2
(45) Date of Patent: Jun. 10, 2008

(54) MULTI-PORT FREE FLOW VALVE AND ELEMENT

(75) Inventors: Steven D. Welch, Earleville, MD (US); Robert J. Elbich, Fogelsville, PA (US); Erik Zetterstrand, Palmerton, PA (US)

(73) Assignees: Parker-Hannifin Corp., Cleveland, OH (US); Exigo Manufacturing, Inc., Bath, PA (US)

( * ) Notice: Subject to any disclaimer, the term of this patent is extended or adjusted under 35 U.S.C. 154(b) by 402 days.

(21) Appl. No.: 10/935,033

(22) Filed: Sep. 7, 2004

(65) Prior Publication Data
US 2006/0048818 A1    Mar. 9, 2006

(51) Int. Cl.
*F16K 7/20* (2006.01)

(52) U.S. Cl. .................. 137/315.07; 251/4; 251/7; 251/366; 251/368

(58) Field of Classification Search ............. 251/4–9, 251/366, 367, 368, 358, 356; 137/315.07
See application file for complete search history.

(56) References Cited

U.S. PATENT DOCUMENTS

| | | | | |
|---|---|---|---|---|
| 5,172,713 A | * | 12/1992 | Hall | 251/367 |
| 5,302,336 A | * | 4/1994 | Hartel et al. | 264/263 |
| 5,395,352 A | * | 3/1995 | Penny | 251/4 |
| 5,921,261 A | * | 7/1999 | Erickson et al. | 137/1 |

* cited by examiner

*Primary Examiner*—Kevin Lee
(74) *Attorney, Agent, or Firm*—Montgomery, McCracken, Walker & Rhoads, LLP; Robert R. Axenfeld

(57) ABSTRACT

A multi-port valve arrangement and removable valve element for use in sanitary environments that comprises at least three ports formed by the joining of at least two valve casing bodies at angles necessary to accommodate multiple connecting fluid streams. A seamless, flexible element is used within the valve arrangement to connect the fluid streams. The valve casings may be hinged on one side to permit removal of the top portion of the valve casings and removal/exchange of the flexible element without complete disassembly of the valve casing and without the use of tools.

5 Claims, 7 Drawing Sheets

MULTI-PORT FREE FLOW VALVE AND ELEMENT

FIELD OF INVENTION

The present invention pertains to the field of fluid handling and positive shutoff-type flow valves. Specifically, the invention pertains to multi-port valves with smooth, non-contaminating straight-through fluid flow for use primarily in the sanitary industries. More specifically, the invention pertains to pinch-type valves that incorporate a flexible, compressible and gasket-less tubing element to create smooth, non-contaminating fluid flow and to create easy and inexpensive removal, disposal and replacement of all wetted surfaces (ie, surfaces making contact with fluid product). One such valve is disclosed in patent application Ser. No. 10/638,658 owned by the assignee of the present invention, the entire disclosure of which is fully incorporated herein by reference.

BACKGROUND OF INVENTION

In many industries, the system for fluid handling must be extremely sanitary and easily cleanable. For example, industries such as biological R&D, biological pilot plants and biological and food production facilities require steam-in-place (SIP) sterilization and clean-in-place (CIP) sanitization for process systems. Thus, valves used in these systems must have certain characteristics to be SIP/CIP capable. Specifically, these valves should be able to withstand the pressure of SIP/CIP procedures, should be completely drainable and should have product contact surfaces that do not yield byproducts that can leach into the process stream after SIP/CIP.

In the sanitary industries, the most prevalent type of valve used is the diaphragm valve. To date, diaphragm valve technology has been the only valve technology to develop multi-port or valve clusters that minimize dead leg. Historically these valves have been viewed as sanitary and easy to clean. However, diaphragm valves possess specific drawbacks that can be significantly improved upon for applications in the sanitary industries. One such universal limitation is that diaphragm valves do not provide a smooth, seamless passageway for fluid flow, as the diaphragms themselves have sealing points and fluid must travel up and around a weir.

Several diaphragm valves have been designed to be SIP/CIP capable and drainable to meet the requirements of sanitary processes. For example, in U.S. Pat. No. 6,672,561, Kerg et al. describe a radial diaphragm valve having an elongated stem with a circumferential recess that receives a seal whose function is to separate the process fluid from the interior of the actuator.

Though Kerg's valve is SIP/CIP capable and drainable, this valve is incapable of having multiple ports and does not possess a product contact area that is entirely disposable. Also, the seal in the elongated stem creates crevices that can potentially trap and harbor contaminants or can potentially leak.

Cordova (U.S. Pat. No. 6,672,566) and Kovacs et al (U.S. Pat. No. 6,237,637) provide diaphragm valves that have multiple ports and are SIP/CIP capable and drainable. Cordova provides a multi-use sterile access/GMP diaphragm valve housing block having a main flow axis and having a first port and an opposing second port extending to a first and second passage, respectively, separated by a main flow weir.

Kovacs' invention is a diverter valve casing that includes a body with a base and plurality of walls that cooperatively form a chamber, a partition within the chamber dividing the chamber into a plurality of compartments. The partition further includes a surface partially defining the first compartments that is partially sloped. Drawbacks to both the Cordova and Kovacs valves are that these inventions create large sealing areas that can be sites for contamination, and they do not offer an entirely disposable product contact area(s). In addition, Cordova's valve requires difficult installation, as the valve must be of a particular orientation to achieve proper drainage.

In U.S. Pat. No. 5,549,134, Browne et al. also provides a diaphragm valve that is drainable. Browne's sanitary valve is comprised of a valve body, a diaphragm and an actuator. The valve body features a cavity defined by the inventor as a "fluid chamber", which has holes in the side and bottom of the cavity for passage of fluid. Passages connect the holes to ports outside the valve body. A diaphragm is mounted over the cavity, a raised area that controls fluid flow through the valve. Though this valve provides drainage, again the diaphragm creates a large seal to protect the contents of the valve from the outside and does not offer a product contact area that is completely disposable, limiting the sterility and easy cleaning of this invention.

Hoobyar et al (U.S. Pat. No. 5,152,500) also provides a drainable valve that is SIP/CIP capable. This sanitary bottom tank valve features one inlet flow passage to communicate flow into the valve body and to at least one outlet passage. An actuator is secured to the valve body to move a diaphragm in an open or closed position in relation to the inlet flow passageway. The main valve passage is typically mounted to the bottom of a tank, which does provide drainage. Hoobyar's valve is limited in its ability to be incorporated into a standard piping system. This valve also has the same shortcomings as those previously described, in that the diaphragm creates a large seal and the valve does not provide a completely disposable product contact area.

In U.S. Pat. No. 5,222,523 to Trimble, a valve comprised of a body defining a through passage, a branch passage and an aperture in the wall of the through passage. A diaphragm, which the inventor defines as a "closure member", is movable between an open and closed position to establish communication between the through and branch passages. Trimble's valve is drainable and SIP/CIP capable. However, the diaphragm creates a large seal that is necessary to protect its fluid contents from the outside environment, and it does not provide a completely disposable product contact area.

In U.S. Pat. No. 4,259,985, Bergmann provides a three-way pinch valve operated by a solenoid with one pinch valve mounted on each end and constructed such that one valve is normally open while the other valve is normally closed. The valve is made three-way by connecting the tubing from the two pinch valves to a T-fitting with a single outlet. Bergmann's valve eliminates the sealing surfaces and weirs associated with the above diaphragm valve designs, but this valve is not SIP/CIP capable, and the three fluid channels cannot be engaged independently.

Valves used for sanitary fluid transfer must not contaminate the fluid product, nor allow internal or external sources of contamination to enter the process stream. Sources of contamination from inside the valve can include material from the valve itself or accumulated residue from cleaning that is entrapped in the valve. Sources of contamination from outside a valve include any material that can enter through seals or diaphragm sealing surfaces. Such sources include germs, viruses or microorganisms in fluids used to actuate the valve. To eliminate internal and external sources of contamination, it is necessary that the valve's product contact surfaces be noncontaminating and the valve body does not have sealing points.

To effectively eliminate contamination, valves for sanitary applications should have a smooth, reliable passageway that is completely drainable to prevent any entrapment of fluid material. In order to be compatible with the often complex configuration of fluid-handling systems, it is critical that the valve be small, simple and equipped with tubing elements that are easy to change out.

Valves used for sanitary fluid transfer should also be designed to minimize dead leg. A complete discussion of the phenomenon of dead leg can be found in the ASME/BPE Guidelines 1999, Part SD "Design for Sterility and Cleanability"; Part SG "Equipment Seals."

There is a need in the industry for a pinch-type valve arrangement that overcomes the problems of multi-port diaphragm and pinch valves currently used in the sanitary industries. Specifically, there is a need for a valve arrangement that provides multiple smooth, seamless and reliable fluid pathways that are SIP/CIP capable, easily disposed of and fully drainable with the valve in any position.

SUMMARY OF INVENTION

The present invention provides an improved multi-port valve arrangement or "cluster" that can be used in sanitary environments, for example. The valve of the present invention comprises at least three key components: the body of the valve, which features a straight-through bore fitting a flexible sleeve (referred to here forward as "element"), that has an axial length longer than that of the valve body; the top-works, which are used to depress or squeeze the tubing element; and the tubing element.

One embodiment of the invention provides a three-port valve whereby the first port (Port X) is along the main axis, which is split into a second port (Port Y) continuing along the same axis and a third port (Port Z) that continues on a perpendicular flow path. A child valve casing is joined to a parent valve casing through an outlet on the side of the parent valve casing, perpendicular to the direction of flow in the child valve casing. The child valve casing is nearly identical in design to the parent valve casing, and can be engineered to have the same side outlet as the parent valve casing for connection to additional valves, so that, importantly, the scope of the present invention is not limited to one parent valve casing and one child valve casing. It will be understood by those skilled in the art that numerous child valve casings can be added in series to the valve cluster, as many as required for the particular application in use.

An embodiment of the present invention comprises a valve cluster comprising five main aspects: the parent valve casing, the parent valve actuating device, the child valve casing, the child valve actuating device and the internal element. The parent valve casing provides axial communication of fluid through Ports X and Y, whereas the child valve casing provides communication of the fluid in a path perpendicular to the parent valve through Port Z. The internal element lines the inside of the parent and child valve casings wherein the fluid is transferred.

Both the top and bottom halves of the parent and child valve casings can be separated to remove the flexible tubing element by detaching bolts, screws or other similar devices. Optionally, the top and bottom halves of the parent and child valves are connected on one side by a hinge, which enables the flexible tubing element to be removed without completely separating the two halves of each respective valve's casing. Preferably, the two halves are connected on the non-hinged side by a single connection, such as a bolt, locking screw or other device that is operable without the use of tools.

There are three styles of topworks available on the parent and child valve casings: manual, fail-close actuated and fail-open actuated. Fail-close actuators are designed to default to the closed position when no air is present. Fail-open actuators are designed to default to the open position when no air is present. In the present invention, both the actuating device for the parent valve and the actuating device for the child valve operate independently of one another. The valve's opening and closing action occurs on the precompressed flexible valve tubing element, which is comprised of durable materials. The principal advantage of this method is that the valve can see over 5 million open-and-close cycles. This provides a reliable, long-lasting valve tubing element that can withstand repeated openings and closings and repeated SIP/CIP cycles.

The only aspect of the valve that directly contacts the process fluid is the single-piece tubing element that extends through both the parent and child valve casings of the greater valve cluster. A principal advantage of this is the ability to remove and dispose of the element and, therefore, all product contact materials (all wetted surfaces). According to one embodiment of the present invention, the tubing element is comprised of three tubes molded into a single-piece construction with three terminating ends. Each end can terminate in a molded tri-clamp with an integrated gasket. As the valve tubing element is molded as a single, crevice-free piece that directly connects to the process system, no seals are required to protect fluid material within the valve from contaminants originating outside the system. By eliminating internal seals or weirs, the tubing element does not provide seams or crevices in which unwanted contaminants can be trapped or grow.

Tubing elements for the present invention are manufactured in a single step by joining two or more pre-molded or extruded tubes of silicone, PTFE-composite, thermoplastics or other composite materials. Each tube can be unlimited in length or can be cut to provide ends on which tri-clamps with integrated gaskets can be molded on. Element ends featuring molded tri-clamps with integrated gaskets are tolerance fitted to the valve casing and can be molded in the same step as the joint connection of the tubes. The element end can also be fitted with backup cups for use in alternative style valve casings.

The joining process of the individual tubes is performed in a single step by placing the tubes on a pre-molded thermoset piece with hollow ends. Before the tubing is placed on the thermoset piece, a stainless steel mandrel is fit into each leg of the piece. The mandrels are used to prevent the thermoset piece from collapsing when filling the mold with material that will cure to the tubing. The end of each mandrel is threaded so that it can be removed using an extraction device, which is also threaded. The extraction device is secured into the stainless steel mandrel and then pulled to remove the attached mandrels and thermoset piece.

Though the present invention describes a flexible tubing element with one junction connection, an unlimited number of junction molds can be added to connect the fluid paths of additional valve casings and additional valve clusters.

As a result of this molding process, the element has a consistent, straight-through cylindrical bore. The principal advantage of this aspect is that all ports of the tubing element are completely drainable in any position. The straight-through bore provides an unobstructed fluid flow path which prevents process shear or damage. As the tubing element is a single molded piece, there are no seams or crevices to entrap contaminants. Because the molding process is performed in a single step, a disposable tubing element is a cost-effective option for the user of the present invention.

In the present invention, the dead leg created between the parent valve and child valve has been minimized in order to maximize the effectiveness of SIP/CIP due to the seamless connection between the valves using the single element.

DETAILED DESCRIPTION OF THE INVENTION

The present invention provides a novel straight-through multi-port valve and removable tubing element. Generally, each valve casing provided has at least three key components: the body of the valve, which features a straight-through bore; the top-works, which are used to depress or squeeze the tubing element; and the tubing element. Preferably, the element has an axial length longer than the valve body. According to one embodiment of the invention, at least one "parent" and one "child" valve casings are connected to provide an at least three-port valve cluster whereby the first two ports are along one axis, and the third port provides a perpendicular flow path. Additional valve casings can be added in series, as many as required for the particular application in use. The "parent" and "child" valve casings of the present invention are nearly identical in nature, and therefore will be collectively discussed at times throughout the description of this invention as "the valve" or "the valve casing" when referring to identical features of the parent and child valve casings.

Figure 1:
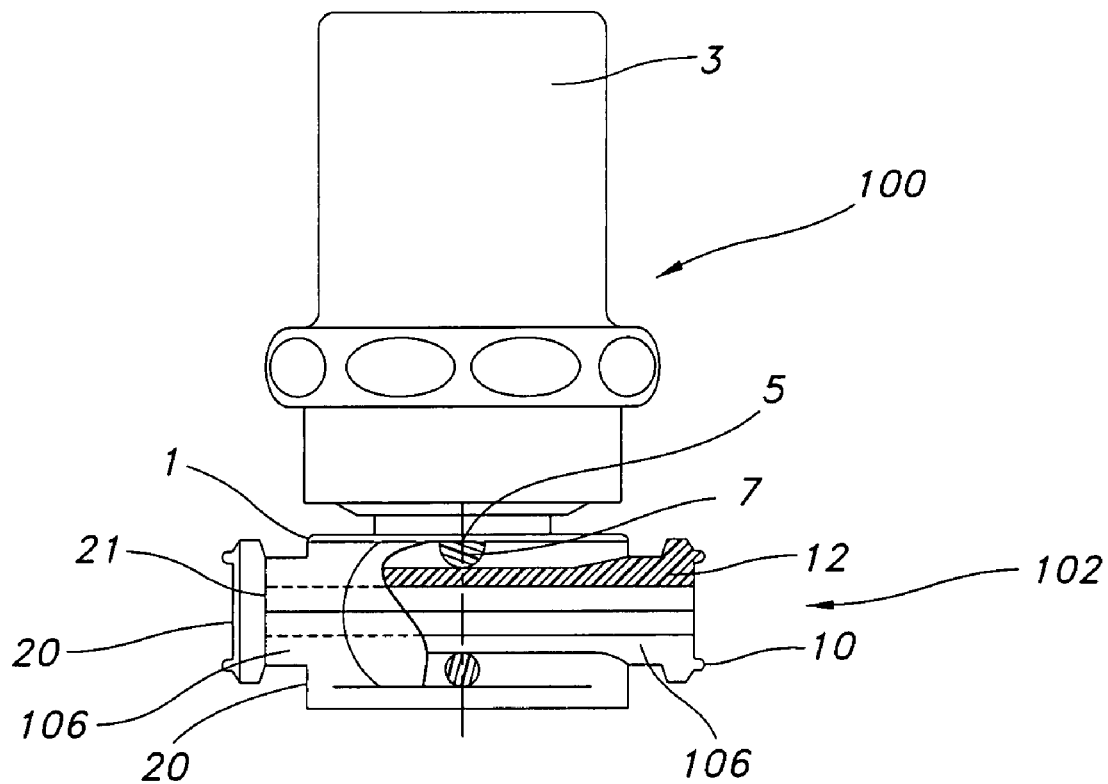
FIG. 1 provides a side view of a pneumatically-activated parent valve casing with integral flange bodies.
Figure 2:
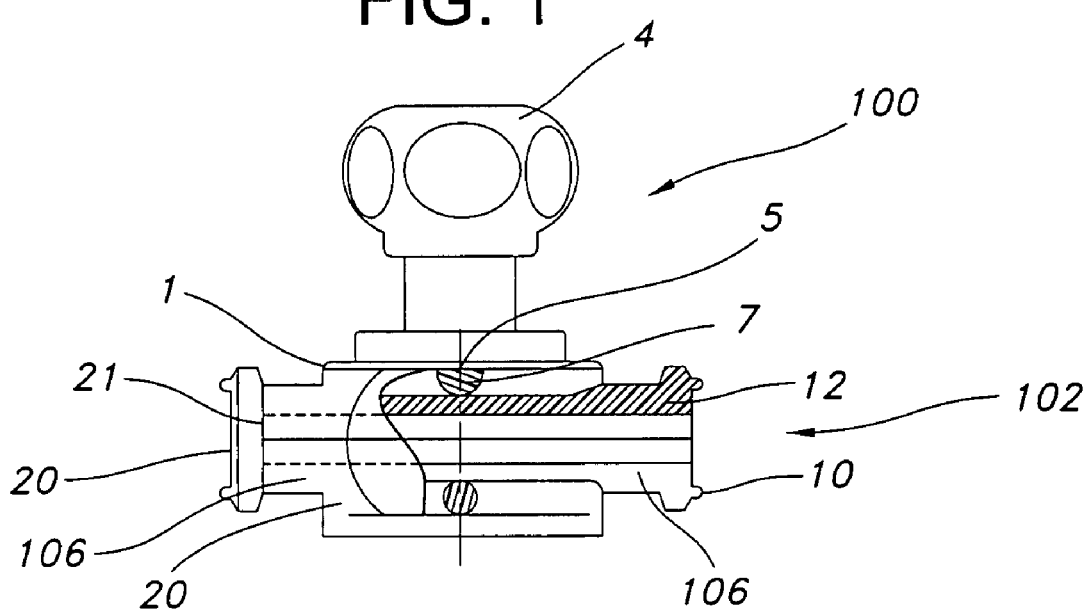
FIG. 2 provides a side view of a manually-activated parent valve casing with integral flange bodies.
Figure 3:
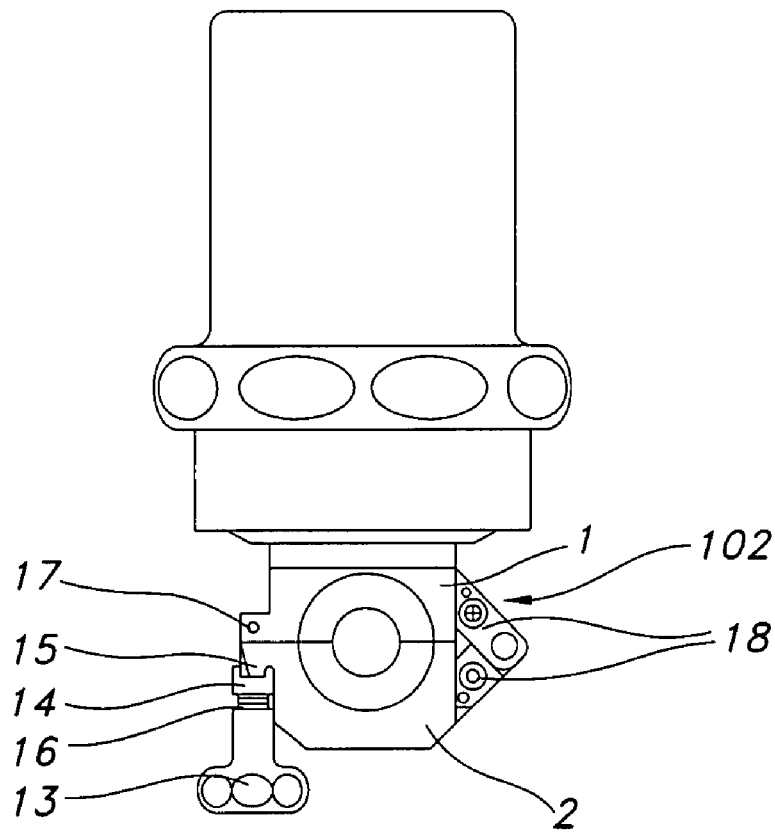
FIG. 3 provides an end view of a pneumatically-activated parent valve casing with integral flange bodies.
Figure 4:
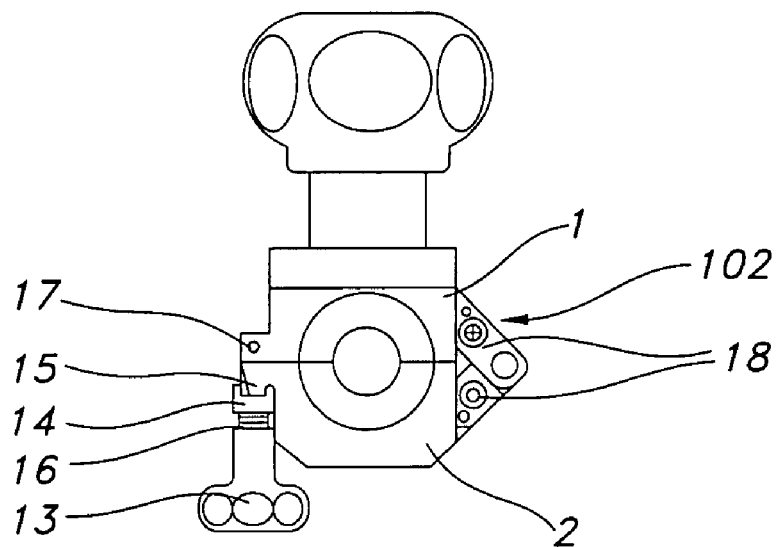
FIG. 4 provides an end view of a manually-activated parent valve casing with integral flange bodies.

FIGS. 1 and 3 illustrate two different views of a parent valve casing according to the present invention, with a pneumatic actuator 100 that requires air pressure in order to operate the valve. FIGS. 2 and 4 illustrate two different views of a parent valve casing of the present invention with a manual actuator 101, which allows the valve to be operated by human hand. The top and bottom portions 1, 2 of one embodiment of the parent valve casing 102 with integral flange bodies 106 are labeled on FIG. 1.

A piston is located in both actuator types 100, 101 in the valve, as shown in FIGS. 1 through 4 that pushes a compression bar 7. The compression bar 7 has a smooth radius to prevent cutting of the tubing element 12 when engaged and is operably connected to both pneumatic and manual actuator styles 100, 101, as shown on FIGS. 1 and 2 respectively, for closing the parent valve. Referring to FIG. 2, preferably the manual version of the valve prevents the flexible tubing element 12 from being over-compressed by having the topworks 4 bottom out on the manual stem 6 when the actuator 101 is fully engaged or closed. In FIG. 1, the pneumatically actuated version of the valve, accomplishes the latter by having components in the actuator 100 bottom out when fully engaged or closed. Preventing over-compression of the element 12 in both pneumatically and manually actuated versions of the valve increases the life of the tubing element 12.

FIG. 1 illustrates one embodiment of the parent valve of the present invention, which is a continuous valve casing 102 with integral flange bodies 106 to receive flexible element 12 which has tri-clamp ends 20 that are tolerance fitted to the valve casing 102 at the lip 21 of each end of the casing. The fitting of the element into the valve embodiments of the present invention is described in greater detail below.

Figure 11:
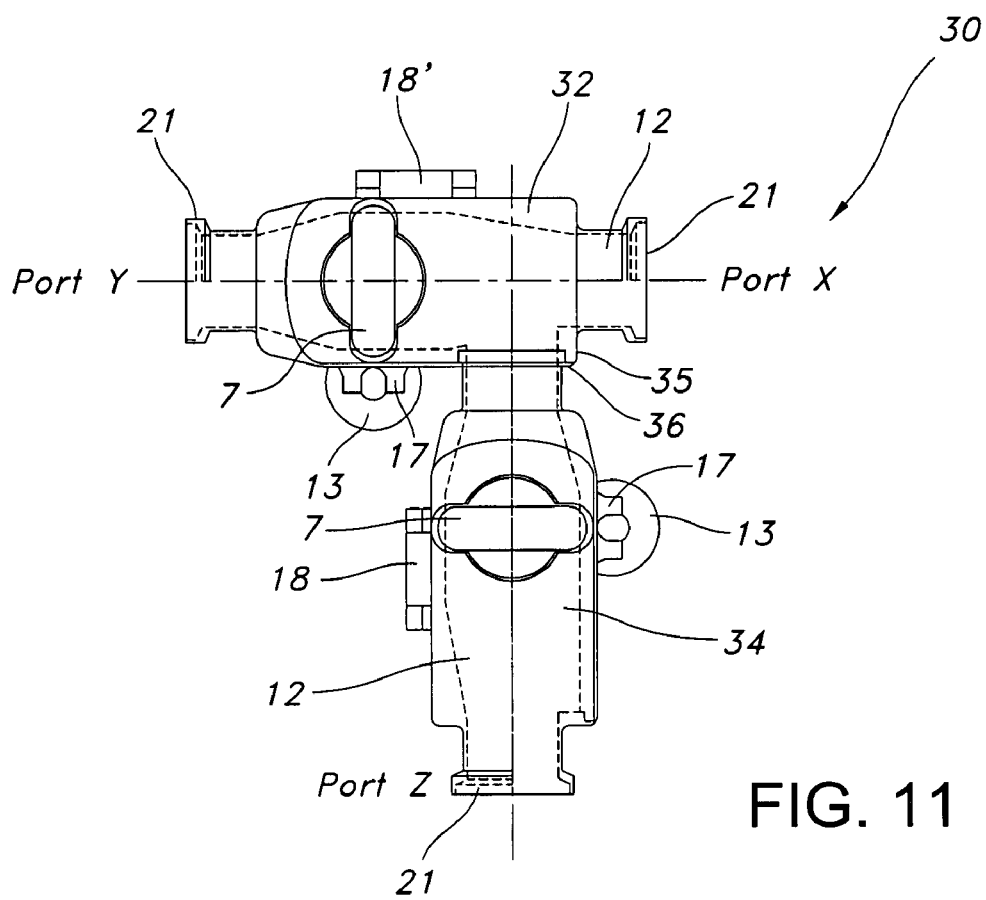
FIG. 11 illustrates a valve cluster of one parent and one child valve casings incorporating the flexible element.

Referring briefly to FIG. 11, a parent valve 32 is connected to a child valve 34. Preferably the only difference between the parent and child valve casings being one slightly tapered end 35 on the child valve 34 that is smaller than the lip 21 provided on both ends of the parent valve casing 32 or the other end of the child valve casing 34. The tapered end fits directly into a fitted lock-in groove 36 directly inside outlet 37 on the parent casing 32 in order to seamlessly join the valve casings into a valve cluster 30.

Figure 5:
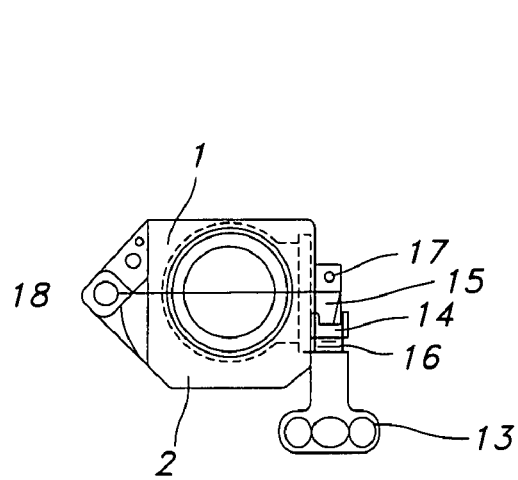
FIG. 5 provides an end view of a hinged parent or child valve casing.
Figure 6:
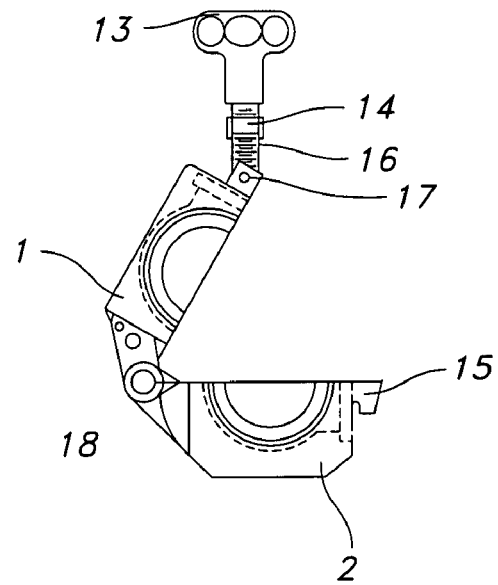
FIG. 6 illustrates end view of a parent or child valve casing hinged open.

FIG. 5 illustrates the end view of a parent or child valve casing according to the present invention, without an actuator. The top and bottom halves 1, 2 of the valve are connected by a hinge 18 on one side, which allows the flexible tubing element 12 to be accessed or replaced without having to completely separate the two halves 1, 2 of the valve casing. The valve is opened without the use of tools or equipment via a bolt or pivot pin 17 comprised, for example, of a threaded locking screw 13, 16 and movable saddle 14. The element 12 is removed by loosening the locking screw 13, 16 on the valve casing until the respective saddle 14 releases from the catch 15 on the valve body, allowing the top half of the casing 1 to be hinged open, as illustrated in FIG. 6.

Figure 7:
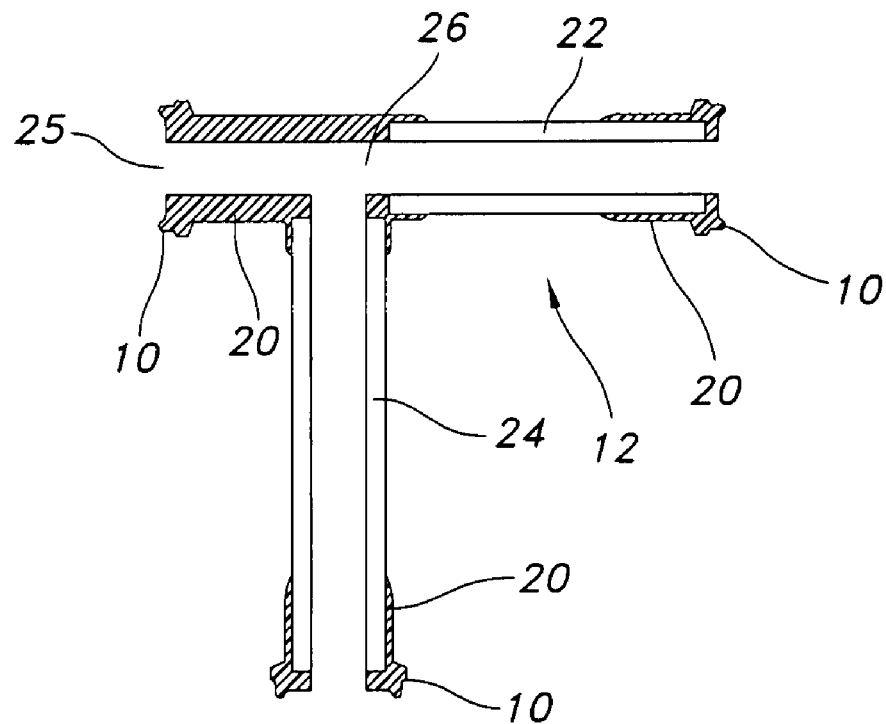
FIG. 7 illustrates an aerial view of one embodiment of the multi-port flexible element for a two valve application.

The removable element 12 of the present invention is illustrated in closer detail in FIG. 7. The element 12 is a flexible tube having two "legs" 22, 24, each of which has an axial length longer than that of the respective valve body for which the "legs" 22, 24 fit, to permit axial compression of the element 12 when locked into place in the valve casing 102 shown in FIG. 1. The gasket 10 on the element 12 end fit directly into the casing 102. The remaining external equipment or piping attachment 25 on the element 12 contains the tri-clamp end 20 but without the extra length that is required of "legs" 22, 24. Axial compression of the element when it is used in a valve casing minimizes tension of the element 12, thus, extending the life of the element 12 by reducing stress that arises when the actuator is closed. The tri-claim ends 20 are tolerance fitted onto valve casing 102 at the integral flange bodies 106 which stabilizes element 12, a critical feature when the valve is permanently installed.

As shown in the embodiment of the element 12 in FIG. 7, a tri-clamp end 20 is molded over the ends of the tubing element 12 that extend outside the valve casings and that extend to a piece of equipment or process piping, etc. The tri-clamp end 20 can be composed of platinum-cured silicone and has a sanitary gasket 10 molded onto the face, making it fully integrated and crevice free. This allows the valve to be connected to the next piece of equipment without the use of separate gaskets, thus, eliminating potential entrapment areas that can promote the growth of bacteria.

FIG. 7 illustrates the flexible element 12 which has a molded T connection 26 that matches the intersection of three valve ports X, Y, and Z inside a parent/child valve cluster 30 such as that provided in FIG. 11. Said T connection 26 is molded such that a seamless, straight-through bore is created to provide unobstructed fluid communication through all ports. The entire removable element 12 is crevice free with no internal gaskets or flanges.

Another important aspect of this invention is the versatility in which this device can be used in sanitary applications. Because the element can be fabricated with unlimited, seamless lengths of tubing, it can be attached to systems with any distance between connection devices, but remain SIP/CIP capable, as the system can still be steamed up to the valve when in the closed position. This lends particular advantages to both sampling processes and additions to process streams.

For example, referring to FIG. 1, in sampling processes, Port X can be connected to the process equipment whereby both the parent valve 32 and child valve 34 are in the closed position. Port Z can be connected to a condensate line. Port Y can either be connected to the sampling device or, preferably, the tubing element 12 can continue outside of the parent valve 32 and be directly connected to one or more sampling devices. After the parent valve 32 has been connected to the process equipment, the child valve 34 can be opened and the tubing element 12 steamed through. As dead leg is virtually absent, sterility is ensured. The child valve 34 can then be closed with the parent valve 32 alternately opened to allow process fluid to flow into one or more sampling devices.

During an "addition" process, the same method as the above described sterilization and sampling process can be performed. However, process fluid from an "addition device" is added to the process equipment and fluid transfer stream. In either parent valve 32 or a child valve 34, fluid may flow in either direction.

Sampling and addition processes represent just two examples of how a valve arrangement according to the present invention can be used in non-traditional valve applications. Those skilled in the art will readily appreciate that the invention may be used in many different applications.

Figure 8:
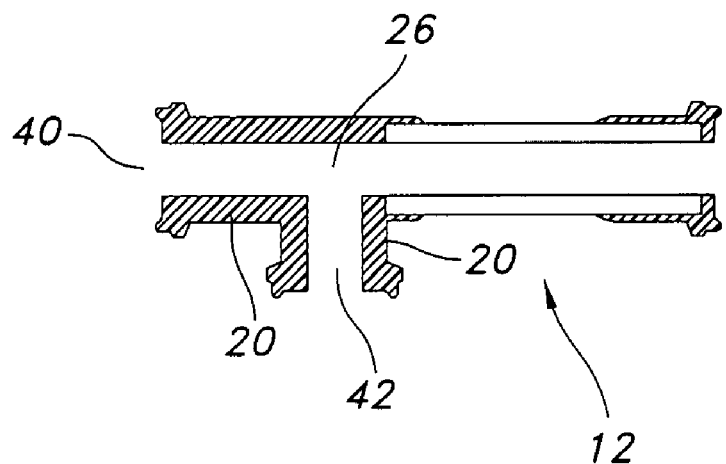
FIG. 8 illustrates an aerial view of another embodiment of the flexible element with one valve leg and two other attachments.

As described in the examples above, the flexible element of the present invention can be manufactured to contain any different configuration of "legs", tri-clamp connections for external equipment or piping, or extended seamless lengths of tubing for other process uses. FIG. 8, for example, illustrates the flexible element 12 for use with a single valve and multiple equipment or piping fittings rather than a two or more valve configuration. As shown in FIG. 8, there is only one "leg" 28 of tubing with a tri-clamp end 20 and molded-in sanitary gasket 10 for use in a valve casing. The remaining other two tri-clamp ends 20 are provided at external equipment attachments 40 and 42.

Figure 9:
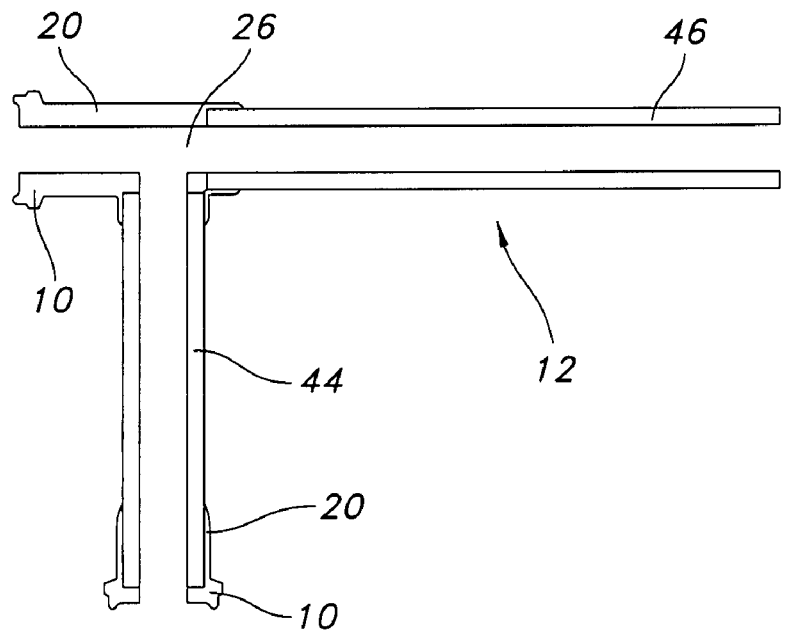
FIG. 9 illustrates an aerial view of an embodiment of the flexible element with one valve leg, one equipment attachment, and one legs of continuous tubing.

According to another embodiment, FIG. 9 shows that the tubing element 12 can be provided with seamless T connection 26, a single "leg" 44 with a tri-clamp end 20 for use with a single valve casing, and an extended length of tubing 46. Rather than terminating at molded tri-clamp ends 20 with integrated gaskets 10, any part of the tubing element 12 can be provided at any desired length. This allows for use in systems with any distance between connection devices. This provides a seamless, SIP/CIP capable system for sanitary processes without needing to connect to outside piping that may not provide the same seamless, sanitary advantages as those provided by the present invention. It will be understood by those of skill in the art that the extended tubing element 12 can be molded as part of the T connection 26 of the present invention, and can be any desired length.

Figure 10:
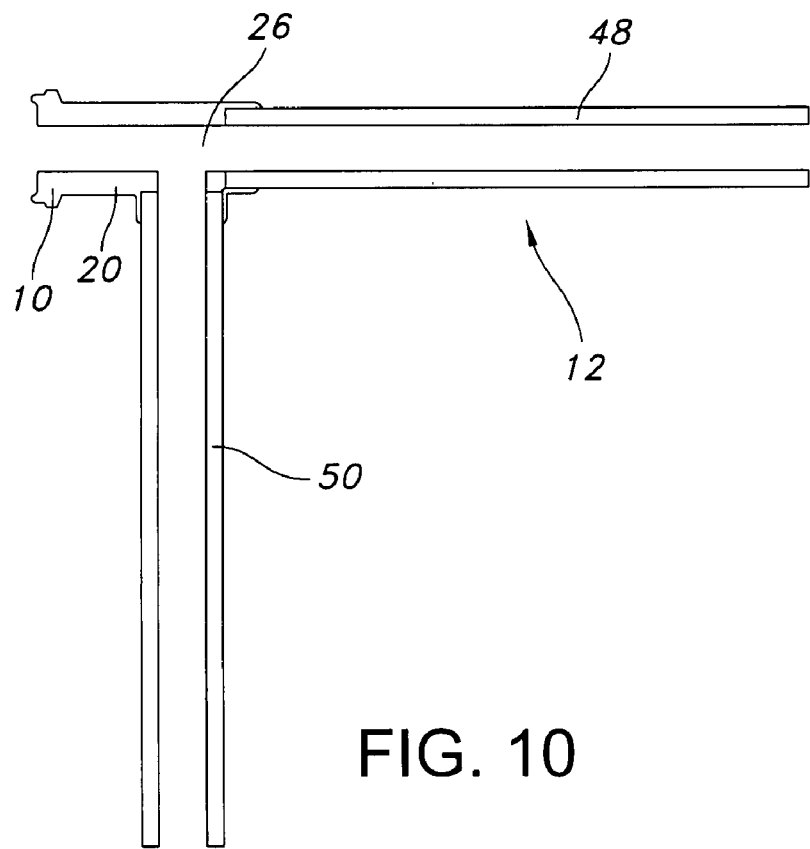
FIG. 10 illustrates an aerial view of an embodiment of the flexible element with one equipment attachment and two legs of continuous tubing.

FIG. 10 provides the same T connection 26 of element 12 with two unlimited tubing lengths 48 and 50, and a single tri-clamp end 20, each of which can be used to connect to equipment, existing piping, sampling devices, etc.

Principal options for the materials of construction for the flexible tubing element are 1) a composite of PTFE and silicone, 2) a composite of PTFE and a fluoroelastomer, and 3) platinum-cured silicone. However, said flexible element can be constructed of any thermoplastic material suitable for clean-in-place and steam-in-place processes.

To manufacture the tubing element 12 shown in FIGS. 7 through 10 and 14, the tubing material is taken in bulk form and cut to a specific desired length but not shorter than the valve casing for which the tubing material will be used, in the case where the element 12 is to be used in one or more valve casings. Next a thermoset piece is fitted with mandrels that are threaded on one end. The cut pieces of tubing are then placed over the ends of said thermoset piece with said attached mandrels to form the desired junction configuration. For example, FIG. 7 shows a T configuration with T connection 26. Other configurations can be produced, and the method of manufacturing the element of the present invention is not limited to a T configuration.

Next, the assembly is placed in a mold and liquid silicone is injected into the mold cavities, which form the tri-clamp ends 20 with integrated gaskets 10 and said T connection 26, as shown, for example, in FIG. 7. The element 12 is molded to a specific length in order to form the required "legs" 22, 24 based on the lengths of the valve bodies.

The junction connections in FIGS. 8, 9, and 10 are molded using the same method. Before the tubing is placed on the thermoset piece with the threaded mandrels and molded over, the tubing is cut to the desired length. Then the assembly is placed in a mold with the desired junction connection and number, if any, of tri-clamp end molds.

Figure 14:
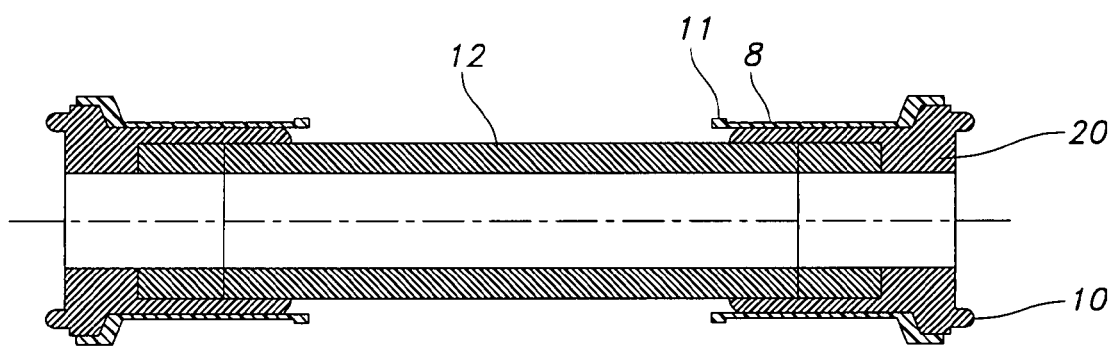
FIG. 14 illustrates a cross-section of the flexible element with the backup cups.

When backup cups 8 are used on the element 12 as shown in FIG. 14, rather than using a parent casing with integral flange bodies, the backup cups 8 are joined to the ends of the element 12 at the tri-clamp ends 20 by molding liquid injection platinum-cured silicone over each end of the tubing element 12, as necessary, for the desired application. Although not shown, the flexible element 12 shown in FIG. 14 is also manufactured with junction connections using the same method discussed above.

FIG. 11 illustrates an aerial view of a single parent/single child valve cluster 30 when one parent 32 and one child 34 valves are joined, with the flexible tubing element 12 of the configuration provided in FIG. 7 installed. The actuators for the valves are not shown in FIG. 11, in order to show the positions of the compressor bars 7 in each valve casing. In order to permit for the connection of the multiple valve casings, at least one of the valve casings in a cluster must have a side outlet 37 to connect the valve casings, e.g. a parent 32 and child 34, as shown in FIG. 11. Because the number of valve casings in a valve cluster is not infinite, the child valve casing 34 of the present invention is also engineered without a side outlet, so that once a valve cluster 30 is complete, a terminal child valve casing is employed. The terminal child valve casing used at the terminal end of a valve cluster will not have an outlet 37, as shown in FIG. 11. It will be apparent to one skilled in the art that the present invention is not limited to a certain number of valve casings or attachments to existing piping equipment, sampling devices, etc., but also that the number of valve casings that can be used is not infinite, and therefore it is necessary and within the scope of this invention to also engineer a child valve casing without an outlet.

Still, referring to FIG. 11, the child valve casing 34 is shown with a slightly tapered end 35 that is smaller than the lip 21 provided on both ends of the parent valve casing 32 or the other end of the child valve casing 34. The tapered end 35 fits directly into a fitted lock-in groove 36 directly inside outlet 37 on the parent casing 32. As needed, the child valve casing 34 of the present invention is manufactured with at least one slightly tapered end 35 to accommodate fitting into another one or more valve outlets 37. The tapered end 35 is preferably the only difference between the parent casing 32 and child casing 34 (that is not a terminal child valve casing) of the present invention.

To install the tubing element 12 into a valve cluster 30, both parent 32 and child 34 valve casings should be hinged open (as shown in FIG. 6). Next, the tapered end 35 of the child valve casing 34 is fitted into the lock-in groove 36 at the outlet 37 of the of the parent valve. The tapered end 35 of the child valve casing 34 is tolerance fitted so that it self-aligns with the groove 36 of the parent valve. The flexible tubing element 12 is correctly aligned with and placed in the bottom halves of the parent 32 and child 34 valve casings. Next, the top half of the child valve casing 34 is closed over the element 12 and then secured in the closed position by tightening the locking screw 13, 16 of the pivot pin 17 until the saddle 14 hooks into the catch 15 and cannot be tightened further. The top half of the parent valve casing 32 is then closed over the tubing element 12. The parent valve is then secured closed by tightening the pivot pin 17 until the saddle 14 hooks into the catch 15 and cannot be tightened further. This forms the valve cluster 30. The element 12 is connected to external piping and/or equipment using sanitary connections that extend beyond the outside of all ends or "ports" of the valve cluster 30, eliminating internal connections.

It should be noted that an actuator in use with one valve, as shown, for example in FIGS. 1 through 4, when in operation with a valve cluster 30 containing more than one valve such as that shown in FIG. 11, can be engaged in sync with or independently of the other valves in the cluster 30.

Figure 12:
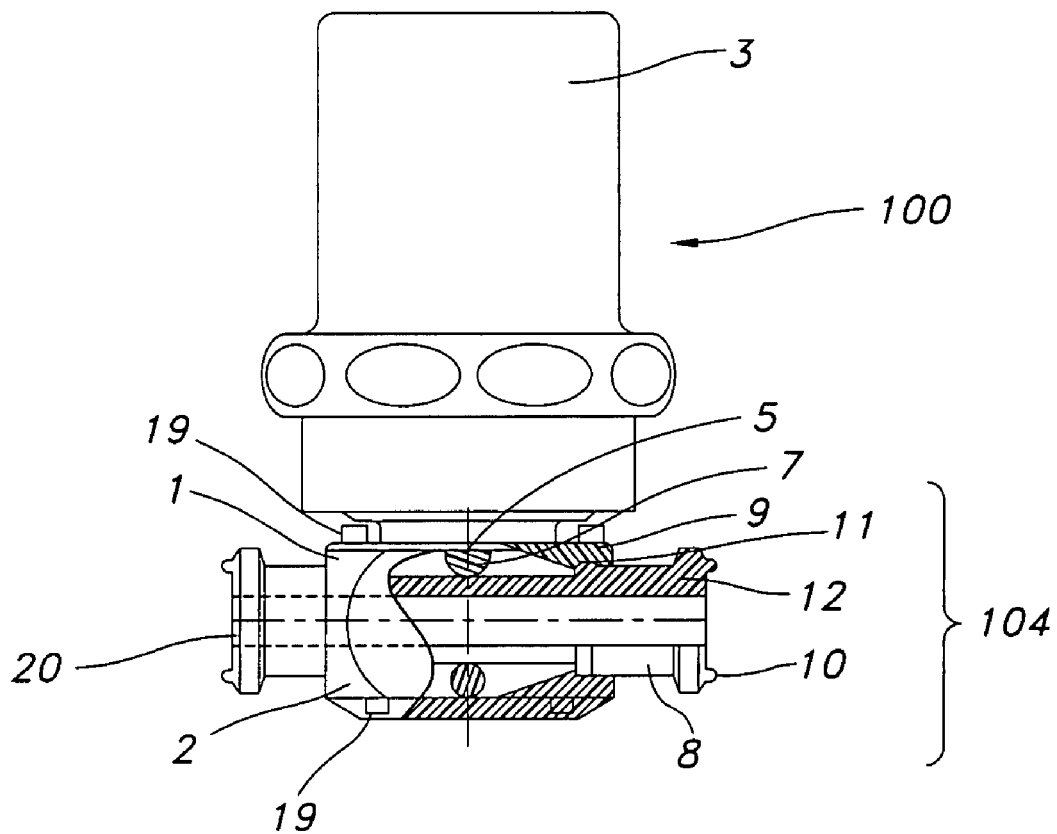
FIG. 12 illustrates a side view of a pneumatically-activated parent valve casing and the flexible element with integral backup cups.
Figure 13:
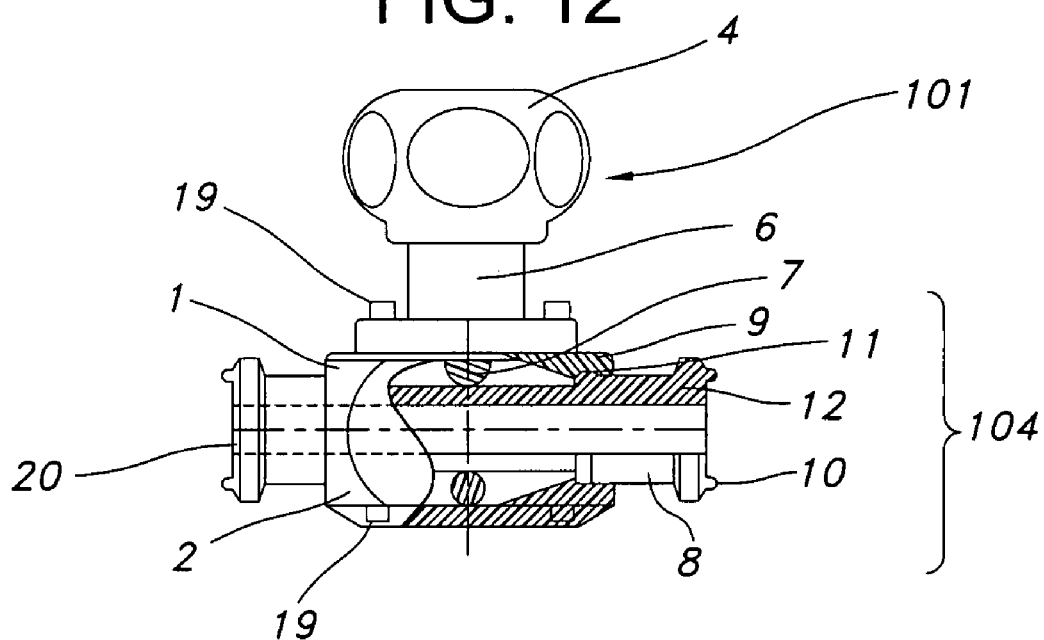
FIG. 13 provides a side view of a manually-activated parent valve casing and the flexible element with integral backup cups.

The parent valve of the present invention can also be designed without the integral flange bodies such that the flexible element 12 is manufactured with specialized backup cups 8, i.e. flanges, on the ends. FIGS. 12 and 13 illustrate this alternative embodiment of the valve casings of the present invention. Parent valve casing 104 that has a slightly shorter valve casing body than the valve casing 102 in FIGS. 1 and 2. Referring to FIG. 12, the element 12 has specialized backup cups 8 that are tolerance fitted onto the molded ends 20 of the tubing element 12 and which lock into the upper and lower halves 1, 2 of the valve body 104 via grooves 9 on the valve casing 104 and a protruding lip 11 on each backup cup 8. The backup cups 8 prevent movement of the element 12 within the valve during operation, which increases the life of the element 12. FIG. 14 illustrates a cross-section of element 12 with the backup cups 8. The backup cups can be tolerance fitted onto the ends of any element of the present invention.

For example, the embodiment of the element 12 shown in FIG. 7 can be manufactured with backup cups 8 at equipment attachment 25 and "legs" 22, 24.

According to another embodiment of the present invention, the valve cluster 30 of FIG. 11 is designed as a single piece such that the individual parent 32 and child 34 valve clusters are molded together into one piece, and outlet 37 is obviously therefore not required.

The above description provides only an exemplary embodiment of the present invention for the purposes of illustration and not limitation. It will be readily apparent to those skilled in the art that the embodiment described herein may be modified or revised in various ways without departing from the spirit and scope of the invention. The scope of the invention is to be measured by the appended claims.

What is claimed is:

1. A flexible valve element comprising at least three cylindrical molded legs, a seamless straight-through bore axis, at least two molded-in gaskets tolerance fitted to fit at least one valve casing or other sanitary equipment or piping, and at least one rigid back-up cup integrally joined to the end of said flexible valve element that aligns into said at least one valve casing, wherein each of at least one said valve casing has a lock-in groove to receive said at least one rigid back-up cup.

2. The flexible valve element of claim 1 wherein said flexible valve element is comprised of a material selected from the group consisting of polytetrafluoroethylene/silicone composite, polytetrafluoroethylene/fluoroelastomer composite, thermoplastic composite, or platinum-cured silicone.

3. The flexible valve element of claim 1 wherein at least one of said legs has an axial length slightly longer than a valve casing having an unobstructed straight-through bore flow axis, and wherein said at least one of said legs has a molded-in gasket tolerance fitted for connection to grooved lips at the end of said valve casing.

4. A flexible valve element for use in a valve, the flexible valve element comprising: at least three cylindrical molded legs forming a T connection having a seamless straight-through bore axis to provide unobstructed fluid communication therein; at least two molded-in gaskets tolerance fitted to fit at least one valve casing or other sanitary equipment or piping, and at least one rigid back-up cup integrally joined to the end of said flexible valve element that aligns into said at least one valve casing, wherein each of at least one said valve casing has a lock-in groove to receive said at least one rigid back-up cup.

5. A flexible valve element for use in a valve, the flexible valve element comprising: at least three cylindrical molded legs having a seamless straight-through bore axis to provide unobstructed fluid communication therein; at least two molded-in gaskets tolerance fitted to fit at least one valve casing or other sanitary equipment or piping, and at least one rigid back-up cup integrally joined to the end of said flexible valve element that aligns into said at least one valve casing, wherein each of at least one said valve casing has a lock-in groove to receive said at least one rigid back-up cup, and wherein the at least three cylindrical molded legs are crevice free with no internal gaskets or flanges.

* * * * *